US 11,455,748 B2

(12) United States Patent
Cai et al.

(10) Patent No.: US 11,455,748 B2
(45) Date of Patent: Sep. 27, 2022

(54) METHOD AND DEVICE FOR UP-SAMPLING A POINT CLOUD

(71) Applicant: InterDigital VC Holdings, Inc., Wilmington, DE (US)

(72) Inventors: Kangying Cai, Rennes (FR); Celine Guede, Cesson-Sevigne (FR); Joan Llach Pinsach, Cesson-Sevigne (FR); Sebastien Lasserre, Thorigné Fouillard (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/753,782

(22) PCT Filed: Oct. 2, 2018

(86) PCT No.: PCT/US2018/053961
§ 371 (c)(1),
(2) Date: Apr. 5, 2020

(87) PCT Pub. No.: WO2019/070703
PCT Pub. Date: Apr. 11, 2019

(65) Prior Publication Data
US 2020/0258261 A1 Aug. 13, 2020

(30) Foreign Application Priority Data
Oct. 6, 2017 (EP) ..................................... 17306347

(51) Int. Cl.
*G06T 9/00* (2006.01)
*G06T 19/20* (2011.01)

(52) U.S. Cl.
CPC ................. *G06T 9/00* (2013.01); *G06T 19/20* (2013.01); *G06T 2210/56* (2013.01); *G06T 2219/2012* (2013.01)

(58) Field of Classification Search
None
See application file for complete search history.

(56) References Cited

U.S. PATENT DOCUMENTS

| | | | | |
|---|---|---|---|---|
| 6,208,347 B1 * | 3/2001 | Migdal | ................... | G06T 17/20 345/419 |
| 2010/0121577 A1 * | 5/2010 | Zhang | ................... | G01S 17/931 701/301 |
| 2019/0227172 A1 * | 7/2019 | Schaefer | ................... | G06T 7/30 |

OTHER PUBLICATIONS

Chalmoviansky et al., "Filling Holes in Point Clouds", Lecture Notes in Computer Science, vol. 2768, Mathematics of Surfaces, 2003, pp. 196-212.

(Continued)

*Primary Examiner* — Jennifer Mehmood
*Assistant Examiner* — Jed-Justin Imperial
(74) *Attorney, Agent, or Firm* — Condo Roccia Koptiw LLP

(57) ABSTRACT

This method for up-sampling a point cloud representing a 3D object, comprises: —detecting (2) points belonging to at least one under-sampled region of the point cloud on the basis of at least one desirable sampling rate (K); —obtaining (12), for each detected point, an associated tangent plane; —inserting (14) in the point cloud at least one neighboring point of each detected point if a distance between the neighboring point and the tangent plane associated with the detected point is less than a first threshold.

20 Claims, 2 Drawing Sheets

(56) References Cited

OTHER PUBLICATIONS

Hoppe et al., "Surface Reconstruction from Unorganized Points", SIGGRAPH '92: Proceedings of the 19th Annual Conference on Computer Graphics and Interactive Techniques, Jul. 1992, pp. 71-78.

Bendels et al., "Detecting Holes in Point Set Surfaces", 14th International Conference in Central Europe on Computer Graphics, Visualization and Computer Vision 2006 (WSCG'2006), Plzen, Republic, Jan. 30, 2006, 8 pages.

Bernardini et al., "The Ball-Pivoting Algorithm for Surface Reconstruction", IEEE Transactions on Visualization and Computer Graphics, vol. 5, No. 4, Oct.-Dec. 1999, pp. 349-359.

Guennebaud et al., "Interpolatory Refinement for Real-Time Processing of Point-Based Geometry", Computer Graphics Forum, vol. 24, No. 3, Oct. 2005, pp. 657-666.

Marani et al., "A Modified Iterative Closest Point Algorithm for 3D Point Cloud Registration", Computer-Aided Civil and Infrastructure Engineering, vol. 31, 2016, pp. 515-534.

Miao et al., "Feature sensitive re-sampling of point set surfaces with Gaussian spheres", Science China: Information Sciences, vol. 55, No. 9, Sep. 2012, pp. 2075-2089.

Huang et al., "Edge-Aware Point Set Resampling", ACM Transactions on Graphics, vol. 32, No. 1, Article No. 9, Feb. 2013, 12 pages.

Alexa et al., "Computing and Rendering Point Set Surfaces", IEEE Transactions on Visualization and Computer Graphics, vol. 9, No. 1, Jan.-Mar. 2003, pp. 3-15.

Yang et al., "Adaptive up-sampling algorithm of point cloud model", Application Research of Computers, vol. 29, No. 6, Jun. 2012, pp. 2354-2356. English Abstract.

Linsen, L., "Point Cloud Representation", Karlsruher Institute of Technology Repository, KITopen-ID 372001, Apr. 2001, 18 pages.

Rusu et al., "Towards 3D Object Maps for Autonomous Household Robots", 2007 IEEE/RSJ International Conference on Intelligent Robots and Systems, San Diego, California, USA, Oct. 29, 2007, 8 pages.

Yan et al., "A New Approach to 3D Object Surface Reconstruction from Unorganized Points", Chinese Journal of Computers, vol. 24, No. 10, Oct. 2001, pp. 1051-1056. English Abstract.

Nguyen et al., "Filling Holes on The Surface of 3D Point Clouds Based on Tangent Plane of Hole Boundary Points", Seventh Symposium on Information and Communication Technology (SoICT '16), Ho Chi Minh City, Vietnam, Dec. 8, 2016, pp. 331-338.

Gao et al., "Feature enhancing aerial LiDAR point cloud refinement", Proceedings of the SPIE—The International Society for Optical Engineeringol, vol. 9013, Mar. 6, 2014, 15 pages.

Liu et al., "Iterative Consolidation of Unorganized Point Clouds", IEEE Computer Graphics and Applications, vol. 32, No. 3, May-Jun. 2012, pp. 70-83.

\* cited by examiner

METHOD AND DEVICE FOR UP-SAMPLING A POINT CLOUD

This application is the National Stage Entry under 35 U.S.C. § 371 of Patent Cooperation Treaty Application No. PCT/US2018/053961, filed Oct. 2, 2018, which was published in accordance with PCT Article 21(2) on Apr. 11, 2019, in English, and which claims the benefit of European Patent Application No. 17306347.0, filed Oct. 6, 2017.

FIELD OF THE DISCLOSURE

The present disclosure generally relates to the field of point cloud data sources that represent 3D objects.

More particularly, it deals with the post-processing of point clouds.

Thus, the disclosure concerns a method for up-sampling a point cloud and a corresponding device. It also concerns methods for encoding and decoding a point cloud and corresponding encoder and decoder. It further concerns a computer program implementing the up-sampling method of the invention.

BACKGROUND OF THE DISCLOSURE

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A point cloud consists in a set of points usually intended to represent the external surface of a 3D object but also more complex geometries like hair or fur that may not be represented efficiently by other data format like meshes. Each point is defined by its 3D spatial location (x, y and z coordinates in the 3D space), i.e. geometry information, and possibly by other associated attributes, which typically include the color information represented in the RGB or YUV or any other color coordinate system. Other attributes may include a transparency, a reflectance, etc. Geometry can be regarded as one of the attribute data. In the rest of this disclosure, both geometry and other attribute data are considered as attributes of points.

In the following, a colored point cloud is considered, i.e. a set of 6-component points (X, Y, Z, R, G, B) or equivalently (X, Y, Z, Y, U, V) where (X, Y, Z) defines the spatial location of a point in a 3D space and (R, G, B) or (Y, U, V) defines a color of this point.

Colored point clouds may be static or dynamic depending on whether the cloud evolves with respect to time. It should be noticed that in case of a dynamic point cloud, the number of points is not constant but, on the contrary, generally evolves with time. A dynamic point cloud is thus a time-ordered list of sets of points.

Point cloud data sources are found in many applications. Important applications relying on huge point cloud data sources can be found in geographic information systems, robotics, medical tomography and scientific visualization.

Beyond these applications that are more industrial and scientifically oriented, the rise in popularity of inexpensive 3D scanners based on time of flight or other depth sensing technologies, 3D capturing on mobile devices and the rise of cloud based 3D printing are creating a huge demand for large scale interoperable compressed 3D point cloud storage and transmission data formats in the consumer market.

Scanned 3D point clouds often have thousands of points and occupy large amounts of storage space. Additionally, they can be generated at a high rate when captured live from 3D scanners, increasing the data rate even further. Therefore, point cloud compression is critical for efficient networked distribution and storage.

It happens that some point clouds, for instance captured using commercial laser range scanners are invariably noisy, mostly caused by scanner artifacts and alignment errors between scans. In addition, occluded or sharp regions are often under-sampled. Due to noise and under-sampling, a direct rendering or surface reconstruction of raw points produces grainy surfaces, gaps and holes, and irregular boundaries. These artifacts are especially visually-disturbing and must be corrected by a post-processing including an up-sampling which is a process of inserting samples between original samples of the dataset in order to increase the sampling rate of the whole dataset or several parts of the dataset.

The under-sampling problem is worse in the case of dynamic point cloud compression where the under-sampled parts of the point clouds which are compressed by an intra coding mode could significantly jeopardize the codec performance.

The prior art works on point cloud up-sampling are mainly based on polynomial fitting, wherein a polynomial of a certain degree (usually 2nd or 3rd degree) is locally fitted around each point of a point cloud.

Polynomial fitting operation is computationally complex. Thus, the polynomial fitting based up-sampling schemes of point clouds are not suitable for use-cases that require low complexity, such as on-the-fly point cloud rendering and point cloud decoding.

SUMMARY OF THE DISCLOSURE

The present disclosure proposes a solution for improving the situation and provides methods and devices according to the enclosed claims.

Accordingly, the present disclosure provides a method for up-sampling a point cloud representing a 3D object, comprising:
  detecting points belonging to at least one under-sampled region of the point cloud on the basis of at least one desirable sampling rate;
  obtaining, for each detected point, an associated tangent plane;
  inserting in the point cloud at least one neighboring point of each detected point if a distance between the neighboring point and the tangent plane associated with the detected point is less than a first threshold.

Thus, the up-sampling method of the disclosure allows a significant reduced complexity by replacing the polynomial fitting of the prior art by a local point insertion operation, which is a highly parallelizable process suitable for real-time applications. Also, by using local tangent planes around points, the underlying local surface represented by the point cloud could be plausibly reserved.

The desirable sampling rate is advantageously defined here as a minimum number of neighbors of each point of the point cloud in a sphere or a cube whose center is the point and having a given size.

Advantageously, a point is detected as belonging to an under-sampled region if:
  the number of its distance-S neighbors is less than a second threshold K, where S is an integer; and the number of its distance-S' neighbors is at least equal to a third threshold K', where S' is an integer larger than S.

This means that if the number of the distance-S neighbors of a point P of the point cloud is less than K and the number of its distance-S' neighbors is at least K', the space around P is regarded as under-sampled. Then new points should be inserted around P according to the method of the present disclosure.

The distance-S neighbors of a point are defined here as the neighboring points falling into a sphere or a cube whose center is the point and with a sphere diameter or a cube scale equal to 2*S.

Thus, two conditions are advantageously required in order to detect a point belonging to at least one under-sampled region. The first condition is directly related to the desirable sampling rate while the second condition avoids adding new points around isolated points of the point cloud, for example unwanted noisy points that may be caused by coding artefacts.

Advantageously, it is decided whether the neighboring point is inserted depending on:
the number of its distance-S neighbors; and/or
a change of a distance between a further neighborhood defined by the distance S' and a local neighborhood defined by the distance S of the detected point when the neighboring point is inserted.

This means that the higher the number of distance-S neighbors of the neighboring point, the more possible that this neighboring point will be added to the point cloud.

Advantageously, the tangent plane associated with a detected point is determined using a Principal Component Analysis, PCA, technique.

Advantageously, the method comprises determining an attribute of each inserted point.

Advantageously, the attribute is the color.

According to an embodiment, the attribute is determined by interpolation from nearby points of the point cloud.

According to an embodiment, the interpolation is performed in the (R, G, B) color space.

According to another embodiment, the interpolation is performed in the (Y, U, V) color space.

The present disclosure also provides an up-sampling device for up-sampling a point cloud representing a 3D object, comprising:
a detection module configured to detect points belonging to at least one under-sampled region of the point cloud on the basis of at least one desirable sampling rate;
a tangent plane module configured to obtain, for each detected point, an associated tangent plane; and
an insertion module configured to insert in the point cloud at least one neighboring point of each detected point if a distance between the neighboring point and the tangent plane associated with the detected point is less than a first threshold.

Advantageously, the modules of the up-sampling device are implemented by one or more processors.

According to another aspect, the present disclosure provides a method for coding a point cloud representing a 3D object, comprising an up-sampling post-processing according to the present disclosure.

The present disclosure also provides a method for decoding, from a bitstream, a point cloud representing a 3D object, comprising an up-sampling post-processing according to the present disclosure.

The present disclosure also provides an encoder comprising the up-sampling device of the present disclosure.

The present disclosure further provides a decoder comprising the up-sampling device of the present disclosure.

The methods according to the disclosure may be implemented in software on a programmable apparatus. They may be implemented solely in hardware or in software, or in a combination thereof.

Since these methods can be implemented in software, they can be embodied as computer readable code for provision to a programmable apparatus on any suitable carrier medium. A carrier medium may comprise a storage medium such as a floppy disk, a CD-ROM, a hard disk drive, a magnetic tape device or a solid state memory device and the like.

The disclosure thus provides a computer-readable program comprising computer-executable instructions to enable a computer to perform the up-sampling method of the invention.

The diagram of FIG. 1 illustrates an example of the general algorithm for such computer program.

BRIEF DESCRIPTION OF THE DRAWINGS

The present invention is illustrated by way of examples, and not by way of limitation, in the figures of the accompanying drawings, in which like reference numerals refer to similar elements and in which.

DETAILED DESCRIPTION OF PREFERRED EMBODIMENTS

Figure 1:
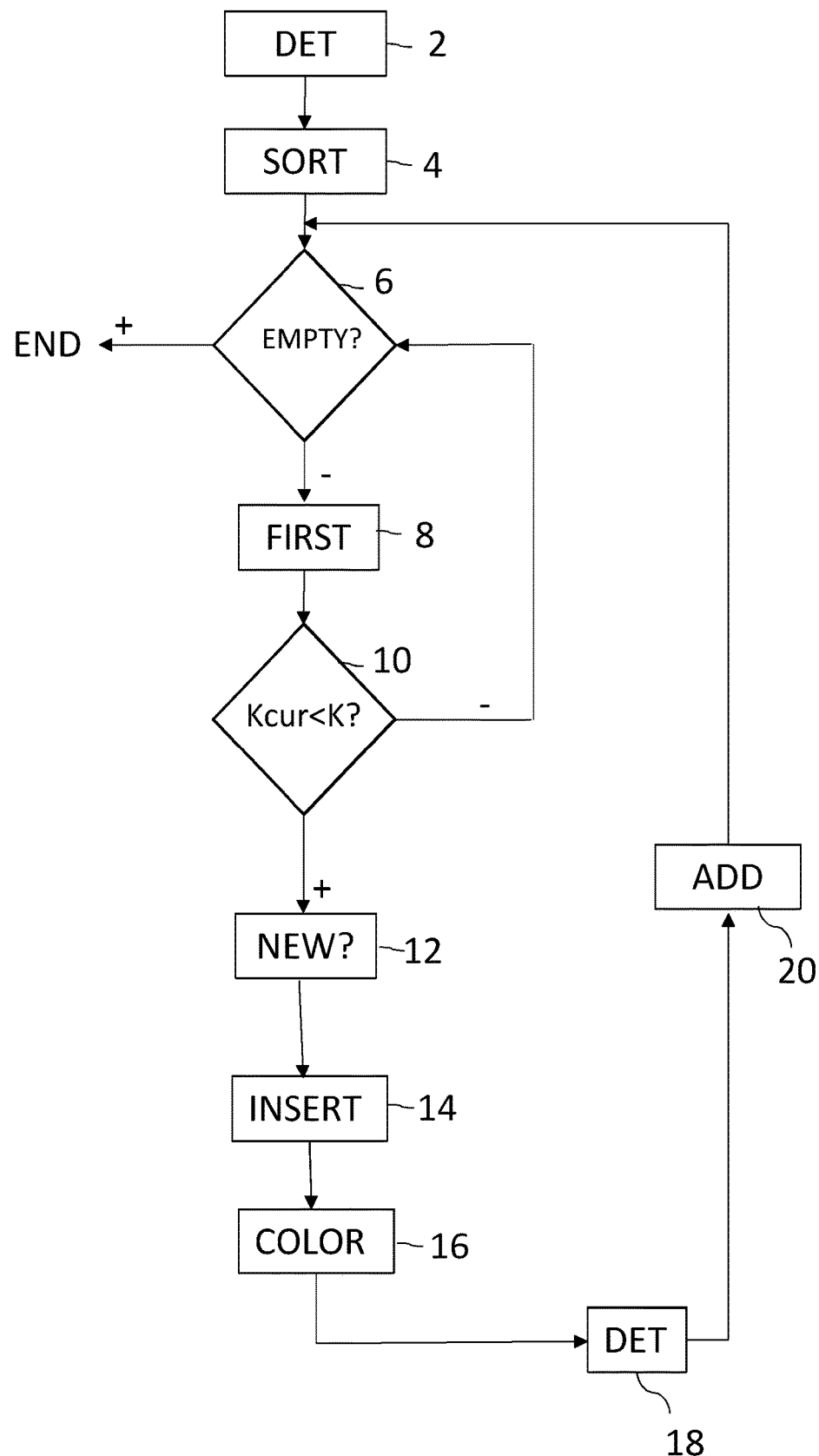
FIG. 1 is a flowchart showing the steps of up-sampling a point cloud, according to an embodiment of the present disclosure.

The method for up-sampling a point cloud according to an embodiment of the present disclosure is illustrated in the flowchart of FIG. 1.

The method starts at step 2 by a detection of points belonging to at least one under-sampled region of the point cloud. These points are called under-sampled points in the following description.

By definition, in the under-sampled region, the sampling rate is less than a required, or desirable, sampling rate K.

The required sampling rate is defined here as the minimum number of neighbors of each point of the point cloud in a sphere or a cube whose center is the point and having a given size.

Thus, a first condition for detecting an under-sampled point is that the number of its distance-S neighbors is less than K.

The distance-S neighbors of a point P of the 3D point cloud could be defined as the neighboring points falling into a sphere or a cube whose center is P and with sphere diameter or cube scale 2*S. Here, the distance-S neighborhood $\text{Neigh}(x_{Neigh}, y_{Neigh}, z_{Neigh})$ of a point $P(x_p, y_p, z_p)$ is defined by:

$$\{\text{Neigh}(x_{Neigh}, y_{Neigh}, z_{Neigh}) | |x_{Neigh} - x_p| \leq S \&\& |z_{Neigh} - z_p| \leq S\}.$$

A second condition for detecting an under-sampled point is that the number of its distance-S' neighbors is at least equal to a threshold K', where S' is larger than S. This second condition permits to avoid inserting in the point cloud new points around isolated points, which are unwanted noisy points and might be caused by coding artefacts.

According to an embodiment, the threshold K' is equal to the required sampling rate K.

Possible values of the above parameters are:
S=1,
K=9,
S'=4,
K'=9.

According to another embodiment, K' is different from K, for example K=8 and K'=9. This means that if the number of the distance-1 neighbors of a point P is less than K and the number of its distance-4 neighbors is at least K', the region around P is regarded as under-sampled. Then, new points should be inserted around P according to the present disclosure.

After all the under-sampled points are detected, they are sorted at step 4 into a queue such that the number of their distance-S neighbors is decreasing.

At step 6, it is checked if the queue of under-sampled points is empty. If this is the case, the process ends.

If the queue is not empty, the first under-sampled point is extracted at step 8 from the beginning of the queue.

Then, it is tested at step 10, if the number Kcur of current S-neighbors of this under-sampled point is still less than the required sampling rate K.

If not, the process returns to step 6.

Otherwise, it is determined at step 12, for each unoccupied distance-S neighbor of the under-sampled point, if it can become occupied, i.e. it can become a new point inserted in the point cloud.

According to a first embodiment, S=1, i.e. only distance-1 neighbors of the under-sampled point are considered to determine if they can become occupied. The advantage of this first embodiment is that there is more guarantee to fill the detail parts of the point cloud such as corners and creases, as it is possible to recalculate the tangent planes of new points.

According to a second embodiment, the range of neighborhood within which new points will be added around each under-sampled point is determined as:

$$S_{Fill} = \begin{cases} 1, & \text{if } K_P^1 > Thres^{AdaptiveRange} \\ \text{the minimum value that satisfies} \\ K_P^{S_{Fill}}P > Thres^{Fill}, & \text{if } K_P^1 \leq Thres^{AdaptiveRange} \end{cases}$$

where $K_P^1$ is the number of distance 1 neighbors of the under-sampled point and $K_P^{S_{Fill}}$ is the number of distance $S_{Fill}$ neighbors of the under-sampled point and where $Thres^{AdaptiveRange}$ and $Thres^{Fill}$ are predetermined thresholds, for example $Thres^{AdaptiveRange}=2$, $Thres^{Fill}=8$.

This second embodiment requires less computational complexity as it does not need to recursively process the new points just generated during the process.

During this step 12, the local tangent plane of the under-sampled point is calculated.

The considered under-sampled point is a point belonging to an under-sampled region and is denoted as $P_{UnderSampled}$.

The local tangent plane of $P_{UnderSampled}$ is determined using the distance-$S_{Normal}$ neighbors of $P_{UnderSampled}$. As there are less points around $P_{UnderSampled}$, relatively larger neighborhood should be collected. We let $S_{Normal}>S$. For instance, a possible value is $S_{Normal}=2$ when S=1.

According to a preferred embodiment, in order to avoid the interference caused by noisy points, before calculating the local tangent plane of $P_{UnderSampled}$, each of its distance-$S_{Normal}$ neighbors is first smoothed by $$Neigh'_{Normal} = \sum_{P_i \in Neighhood_{Neigh_{Normal}}^{smooth}} P_i / |Neighhood_{Neigh_{Normal}}^{smooth}|$$

where $Neigh_{Normal}$ is one of the distance-$S_{Normal}$ neighbors of $P_{UnderSampled}$, $Neighhood_{Neigh_{Normal}}^{S_{Normal}}$ is the distance-$S_{smooth}$ neighbors of $Neigh_{Normal}$ and $Neigh'_{Normal}$ is the smoothed result of $Neigh_{Normal}$.

For instance, a possible value of $S_{smooth}$ is 2 when S=1.

Then, the tangent plane of $P_{UnderSampled}$ is determined by principle component analysis (PCA) of the smoothed distance-$S_{Normal}$ neighbors of $P_{UnderSampled}$.

According to the PCA technique, a mean point M and a covariance matrix C are calculated using the distance-S neighborhood of P, according to the following formulas:

$$M = \frac{1}{n}\sum_{i=1}^{n} Neigh'_{Normal_i}$$

$$C = \frac{1}{n}\sum_{i=1}^{n} Neigh'_{Normal_i} Neigh'^T_{Normal_i} - MM^T$$

where n is the number of distance-S neighbors of P.

Then, the eigenvectors and corresponding eigenvalues of C are calculated. The eigenvectors are sorted in decreasing order of eigenvalues. The normalized eigenvector corresponding to the smallest eigenvalue of C is regarded as the normal of P.

Then, the tangent plane is determined using the determined mean point M and normal of P.

Here, only points with integer spatial positions are considered as new point candidates to be inserted in the point cloud.

According to a first embodiment, for each of the unoccupied distance-S neighbors, $P_{UnOccup}^i$, of $P_{UnderSampled}$, its possibility of being inserted around $P_{UnderSampled}$ is determined based on the following 3 factors.

1. 1st Factor

The first factor is $|\{Neigh_{DisS}^i\}|$, the number of the distance-S neighbors of $P_{UnOccup}^i$.

This factor penalizes those potential new points requiring inserting more points around them. The higher $|\{Neigh_{DisS}^i\}|$ is, the more possible that $P_{UnOccup}^i$ will be added to the point cloud.

2. 2nd Factor

According to a first variant, the second factor is the change of the distance between the further neighborhood and the local neighborhood of $P_{UnderSampled}$ if $P_{UnOccup}^i$ is inserted, denoted as $DisChange_{Neighborhood_i}$.

The distance between the further and the local neighborhoods of $P_{UnderSampled}$ is defined by $$Dis_{Neighborhood} = \sum_{\{Neigh_{Further}^m\}} \min_{\{Neigh_{Local}^n\}} (||Neigh_{Further}^m - Neigh_{Local}^n||),$$

where $\{Neigh_{Local}^n\}$ and $\{Neigh_{Further}^m\}$ are the local and further neighborhoods of $P_{UnderSampled}$, i.e. $\{Neigh_{Local}^n\}=\{Neigh_{DisS}^i\}$ and $\{Neigh_{Further}^m\}$ is defined by the distance-S' neighbors of $P_{UnderSampled}$.

Note that $P_{UnOccup}^i \in \{Neigh_{Local}^n\}$ if it is added to the point cloud.

$DisChange_{Neighborhood}^i$ is defined by $$DisChange_{Neighborhood}^i = Dis_{Neighborhood} - Dis'_{Neighborhood}$$

where $Dis_{Neighborhood}$ and $Dis'_{Neighborhood}$ are the distances between the further and local neighborhoods of $P_{UnderSampled}$ before and after $P_{UnOccup}^i$ is added to as a new point.

Note that the value of $DisChange_{Neighborhood}^i$ cannot be negative. This factor quantifies how $P_{UnOccup}^i$ can help connect the further neighborhood to the local neighborhood of $P_{UnderSampled}$. The higher $DisChange_{Neighborhood}^i$ is, the more possible that $P_{UnOccup}^i$ will be added to the point cloud. According to a second variant, the second factor is defined as the change of the distance between the distance-$S_{Large}$ neighborhood of $P_{undersampled}$ and $NN_{S_{Fill}}$ if $P_{UnOccup}^i$ is inserted, denoted as $DisChange_{Neighborhood}^i$. $S_{Large}$ is defined as a neighborhood range larger than $S_{Fill}$. For example, $S_{Large}=S_{Fill}+3$.

$NN_{S_{Fill}}$ denotes all the existing neighbors of $P_{Undersampled}$ within the neighborhood range $S_{Fill}$, i.e.

$$NN_{S_{Fill}} = \{Neigh_{NN_{S_{Fill}}}^i (x_{Neigh}, y_{Neigh}, z_{Neigh}),$$
$$|x_{Neigh} - x_P| \leq S_{Fill} \,\&\&\, |y_{Neigh} - y_P| \leq S_{Fill} \,\&\&\, |z_{Neigh} - z_P| \leq S_{Fill}\}$$

The distance between distance-$S_{Large}$ neighborhood of $P_{undersampled}$ and $NN_{S_{Fill}}$ is defined by $$Dis_{Neighborhood} = \sum_{\{Neigh_{S_{large}}^a\}} \min_{\{Neigh_{NN_{S_{Fill}}}^b\}} (\|Neigh_{S_{large}}^a - Neigh_{NN_{S_{Fill}}}^b\|)$$

where $\{Neigh_{S_{Large}}^a\}$ is the distance-$S_{Large}$ neighborhood of $P_{Undersampled}$.

$DisChange_{Neighborhood}^i$ is defined by $$DisChange_{Neighborhood}^i = Dis_{Neighborhood} - Dis'_{Neighborhood}$$

where $Dis_{Neighborhood}$ and $Dis'_{Neighborhood}$ are the distances between distance-$S_{Large}$ neighborhood of $P_{Undersampled}$ and $NN_{S_{Fill}}$ before and after $P_{UnOccup}^i$ is added to the point cloud.

Note that the value of $DisChange_{Neighborhood}^i$ cannot be negative. This factor quantifies how $P_{UnOccup}^i$ can help connect the distance-$S_{Large}$ neighborhood of $P_{Undersampled}$ and $NN_{S_{Fill}}$. The higher $DisChange_{Neighborhood}^i$ is, the more possible that $P_{UnOccup}^i$ will be added.

3. 3$^{rd}$ Factor

The third factor is the distance between $P_{UnOccup}^i$ and the local tangent plane of $P_{UnderSampled}$ $$Dis_{Tang}^i = |(P_{UnOccup}^i - Mean_{P_{UnderSample}}) \cdot Normal_{P_{UnderSampled}}|.$$

where $Mean_{P_{UnderSample}}$ and $Normal_{P_{UnderSample}}$ are the mean and normal of $P_{UnderSampled}$, i.e. the mean point M and the normal of $P_{Undersampled}$ determined using PCA. This factor represents how close $P_{UnOccup}^i$ is to the underlying local surface around $P_{Undersampled}$ represented by the point cloud.

The higher $Dis_{Tang}^i$ is, the less possible that $P_{UnOccup}^i$ will be added to the point cloud. According to an embodiment, $Mean_{P_{Undersampled}}$ is the mean point of $NN_{S_{Fill}}$.

Every three different points in $NN_{S_{Fill}}$ form a triangle. It is considered that $Normal_{P_{Undersampled}}$ is the mean of the normals of all these triangles.

Then, the possibility of $P_{UnOccup}^i$ to become occupied is determined by $$\begin{cases} w_1 \frac{|\{Neigh_{DisS}^i\}|}{\max_i(|\{Neigh_{DisS}^i\}|)} + w_2 \frac{DisChange_{Neighborhood}^i}{\max_i(DisChange_{Neighborhood}^i)}, \\ \qquad \text{if } Dis_{Tang}^i \leq THRES_{TANG} \\ 0.0, \text{ if } Dis_{Tang}^i > THRES_{TANG} \end{cases}$$

where $w_1$ and $w_2$ are predefined weights, for example $w_1=w_2=\frac{1}{2}$, and $THRES_{Tang}$ is a predefined threshold, for example $THRES_{Tang}=1.0$.

Thus, $P_{UnOccup}^i$ with higher possibility values is more proper to be added to the point cloud. Let's suppose that the number of the current distance-S neighbors of $P_{Undersampled}$ is $K_{Cur}$. In a preferred embodiment, the ($K_{TargInsert}-K_{Cur}$) unoccupied distance-S neighbors of $P_{Undersampled}$ with higher possibilities are inserted to the point cloud at step 14 if their possibility to become occupied is not zero. Excluding those unoccupied neighbors with zero possibilities to become occupied preserves the original local surface represented by the neighborhood around $P_{Undersampled}$. Preferably $K_{TargInsert}>K$. For example, $K_{TargInsert}=12$ when K=9.

A second embodiment to decide whether or not a non-occupied position $P_{UnOccup}^i$ is added to the reconstructed point cloud is as follows. $P_{UnOccup}^i$ is added to the reconstructed point cloud if $Dis_{Tang}^i<Thres_{Tangent}$ and $DisChange_{Neighborhood}^i>Thres_{NeighDisChange}$. For example, possible values are $Thres_{Tangent}=1.0$ and $Thres_{NeighDisChange}=1$.

For the embodiment described above, where the range of neighborhood within which new points will be added around each under-sampled point is determined as $S_{Fill}$. For each of the non-occupied neighbors within the range $S_{Fill}$, it is determined whether or not add it to the point cloud according to the implementation described above.

According to this embodiment, each of the non-occupied positions within the bounding-box whose center is $P_{Undersampled}$ and size is $2S_{Fill}*2S_{Fill}*2S_{Fill}$ is considered as a candidate new point to be added to the reconstructed point cloud.

According to a variant, $Mean_{P_{Undersampled}}$ is used instead of $P_{Undersampled}$ for the determination of candidate new points. This enables to further avoid adding new points around noisy or isolated points.

Then, at step 16, for each new point $P_{New}$ inserted in the point cloud at step 14, its color is determined by interpolating the color attribute of its nearby existing points of the point cloud.

The color interpolation may be performed either in the (R, G, B) or in the (Y, U, V) space.

For instance, the interpolation advantageously uses the following formula expressed in the (Y, U, V) space:

$$(Y, U, V)_{P_{New}} = ((Y, U, V)_{P_{Nearest}} - (Y, U, V)_{P_{UnderSampled}}) * \left( \frac{\|P_{New} - P_{Undersampled}\|}{\|P_{Nearest} - P_{Undersampled}\|} \right),$$

where $P_{Nearest}$ is the nearest neighbor to $P_{New}$ except $P_{UnderSampled}$. The same formula can be written in the (R, G, B) space by replacing (Y, U, V) by (R, G, B).

At step 18, the latest added points whose number of distance-S neighbors is less than K are detected as new under-sampled points.

According to a preferred embodiment, the new under-sampled points are inserted at step 20 to the sorted queue of under-sampled points according to the number of their distance-S neighbors, as the number of distance-S neighbors of the points in the sorted queue is always kept decreasing.

According to an embodiment of calculating the normal of the new under-sampled points, in order to reduce the complexity of the process, the normal of the new points inserted around $P_{UnderSampled}$ is set as the normal of $P_{UnderSampled}$ for the determination of their local tangent planes.

According to another embodiment, the new under-sampled points are not inserted, in order to reduce the complexity of the process.

Figure 2:
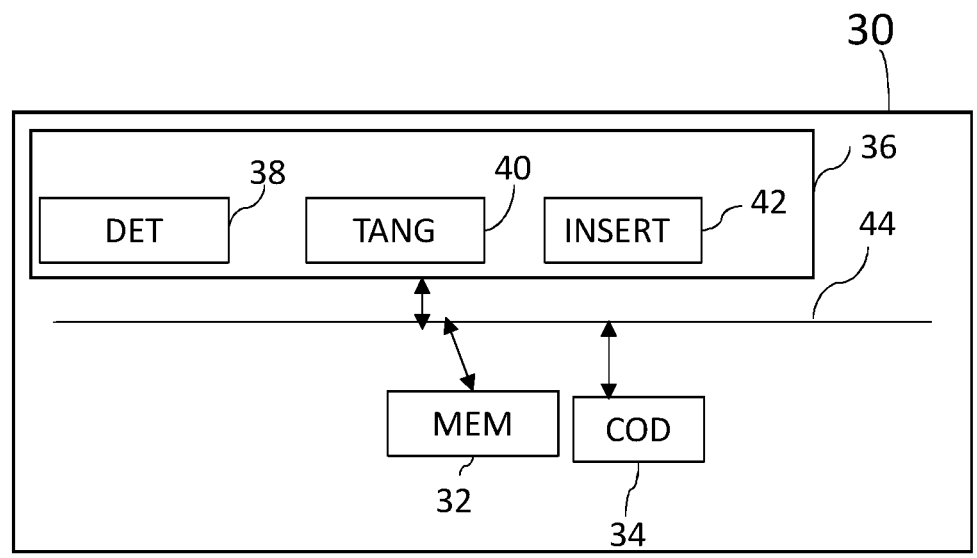
FIG. 2 is a schematic view illustrating an encoder, according to an embodiment of the disclosure.

FIG. 2 is a block diagram of an exemplary embodiment of an encoder 30 implementing the encoding method of a 3D point cloud of the present disclosure.

Advantageously, the encoder 30 includes one or more processors and a memory 32.

The encoder 30 comprises a coding module 34 configured to encode an input 3D point cloud into a bit stream.

According to the present disclosure, the encoder 30 also comprises an up-sampling device 36 comprising:
  a detection module 38 configured to detect points belonging to at least one under-sampled region of the point cloud on the basis of at least one desirable sampling rate;
  a tangent plane module 40 configured to obtain, for each detected point, an associated tangent plane; and
  an insertion module 42 configured to insert in the point cloud at least one neighboring point of each detected point if a distance between the neighboring point and the tangent plane associated with the detected point is less than a first threshold.

According to the represented embodiment, a bus 44 provides a communication path between various elements of the encoder 30. Other point-to-point interconnection options (e.g. non-bus architecture) are also feasible.

Figure 3:
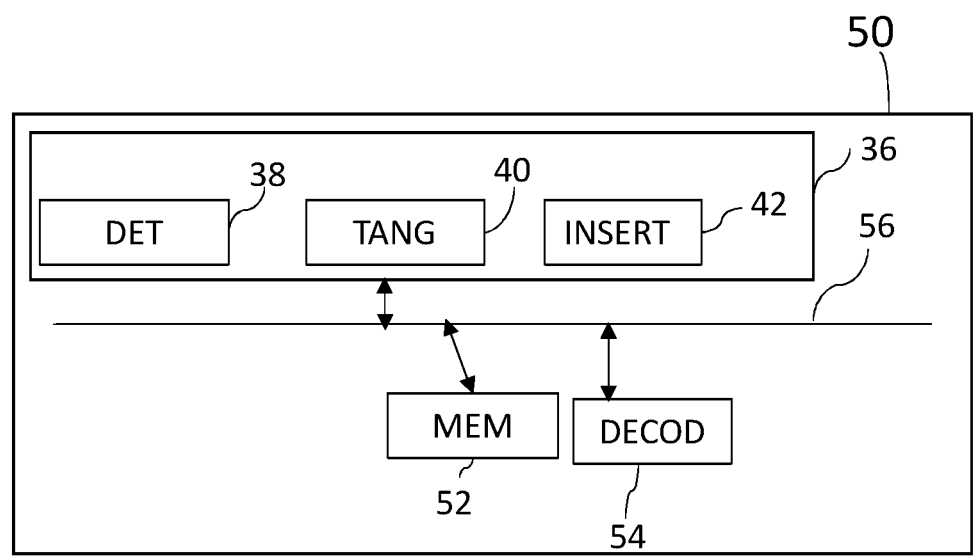
FIG. 3 is a schematic view illustrating a decoder, according to an embodiment of the disclosure.

FIG. 3 is a block diagram of an exemplary embodiment of a decoder 50 implementing the decoder method of the present disclosure.

Advantageously, the decoder 50 includes one or more processors and a memory 52.

The decoder 50 comprises a decoding module 54 configured to decode an input bit stream into a 3D point cloud.

According to the present disclosure, the decoder 50 also comprises the up-sampling device 36 described above.

According to the represented embodiment, a bus 56 provides a communication path between various elements of the decoder 50. Other point-to-point interconnection options (e.g. non-bus architecture) are also feasible.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention is not limited to the particular embodiments disclosed, but that the invention includes all embodiments falling within the scope of the appended claims.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

A person skilled in the art will readily appreciate that various parameters disclosed in the description may be modified and that various embodiments disclosed and/or claimed may be combined without departing from the scope of the invention.

The invention claimed is:

1. A method comprising:
  detecting a plurality of points of a point cloud, wherein a detected point has a number of distance-S neighbors being less than a first value and a number of distance-S' neighbors being greater than a second value, wherein S' is larger than S;
  obtaining, for the plurality of detected points, associated planes; and
  inserting in the point cloud at least one neighboring point for each of the plurality of detected points based on a distance between the neighboring point and the plane associated with the detected point.

2. The method of claim 1, wherein the plurality of points of a point cloud are detected on a basis of at least one sampling rate, and wherein the at least one sampling rate is defined as a minimum number of neighbors of each point of the point cloud in a sphere or a cube whose center is the point and having a given size.

3. The method of claim 1, wherein it is decided whether the neighboring point is inserted depending on one or more of:
  the number of the distance-S neighbors; or
  a change of a distance between a further neighborhood defined by the distance S' and a local neighborhood defined by the distance S of the detected point when the neighboring point is inserted.

4. The method of claim 1, wherein the plane associated with the detected point is determined using a Principal Component Analysis (PCA) technique.

5. The method of claim 1, further comprising determining an attribute of each inserted point.

6. The method of claim 5, wherein the attribute is a color.

7. The method of claim 5, wherein the attribute is determined by interpolation from nearby points of the point cloud.

8. The method of claim 7, wherein the interpolation is performed in a R, G, B color space or in a Y, U, V color space.

9. A method for coding a point cloud representing a 3D object, comprising an up-sampling post-processing according to claim 1.

10. A method for decoding, from a bitstream, a point cloud representing a 3D object, comprising an up-sampling post-processing according to claim 1.

11. An apparatus comprising a memory and one or more processors configured to:
  detect a plurality of points of a point cloud, wherein a detected point has a number of distance-S neighbors being less than a first value and a number of distance-S' neighbors being greater than a second value, wherein S' is larger than S;

obtain, for the plurality of detected points, associated planes; and insert in the point cloud at least one neighboring point for each of the plurality of detected points based on a distance between the neighboring point and the plane associated with the detected point.

12. The apparatus of claim 11, wherein the plurality of points of a point cloud are detected on a basis of at least one sampling rate, and wherein the at least one sampling rate is defined as a minimum number of neighbors of each point of the point cloud in a sphere or a cube whose center is the point and having a given size.

13. The apparatus of claim 11, wherein it is decided whether the neighboring point is inserted depending on one or more of:

the number of the distance-S neighbors; or a change of a distance between a further neighborhood defined by the distance S' and a local neighborhood defined by the distance S of the detected point when the neighboring point is inserted.

14. The apparatus of claim 11, wherein the plane associated with the detected point is determined using a Principal Component Analysis (PCA) technique.

15. The apparatus of claim 11, wherein the one or more processors are further configured to determine an attribute of each inserted point.

16. The apparatus of claim 15, wherein the attribute is a color.

17. The apparatus of claim 15, wherein the attribute is determined by interpolation from nearby points of the point cloud.

18. The apparatus of claim 17, wherein the interpolation is performed in a R, G, B color space or in a Y, U, V color space.

19. An encoder comprising the apparatus of claim 11.

20. A decoder comprising the apparatus of claim 11.

* * * * *